United States Patent [19]
Muir et al.

[11] Patent Number: 6,064,767
[45] Date of Patent: *May 16, 2000

[54] AUTOMATIC LANGUAGE IDENTIFICATION BY STROKE GEOMETRY ANALYSIS

[75] Inventors: Douglas W. Muir, Vienna, Austria; Timothy R. Thomas, Santa Fe, N.Mex.

[73] Assignee: Regents of the University of California, Los Alamos, N.Mex.

[*] Notice: This patent issued on a continued prosecution application filed under 37 CFR 1.53(d), and is subject to the twenty year patent term provisions of 35 U.S.C. 154(a)(2).

[21] Appl. No.: 09/008,225

[22] Filed: Jan. 16, 1998

[51] Int. Cl.$^7$ ........................................... G06K 9/46
[52] U.S. Cl. ..................... 382/190; 382/177; 382/224; 382/201
[58] Field of Search ..................... 382/190, 203, 382/224, 228, 229, 177, 192, 225, 218, 201; 707/500, 536

[56] References Cited

U.S. PATENT DOCUMENTS

| | | | |
|---|---|---|---|
| 5,319,721 | 6/1994 | Chefalas et al. | 382/13 |
| 5,442,715 | 8/1995 | Gaborski et al. | 382/187 |
| 5,444,797 | 8/1995 | Spitz et al. | 382/192 |
| 5,455,871 | 10/1995 | Bloomberg et al. | 382/173 |
| 5,748,805 | 5/1998 | Withgott et al. | 382/306 |
| 5,844,991 | 12/1998 | Hochberg et al. | 382/177 |

OTHER PUBLICATIONS

Nakayama et al, "European Language Determination . . . " Jul. 1993 pp. 159–162.

*Primary Examiner*—Bhavesh Mehta
*Attorney, Agent, or Firm*—Ray G. Wilson

[57] ABSTRACT

A computer-implemented process identifies an unknown language used to create a document. A set of training documents is defined in a variety of known languages and formed from a variety of text styles. Black and white electronic pixel images are formed of text material forming the training documents and the document in the unknown language. A plurality of line strokes are defined from the black pixels and point features are extracted from the strokes that are effective to characterize each of the languages. Point features from the unknown language are compared with point features from the known languages to identify one of the known languages that best represents the unknown language.

2 Claims, 7 Drawing Sheets

Microfiche Appendix Included
(1 Microfiche, 70 Pages)

AUTOMATIC LANGUAGE IDENTIFICATION BY STROKE GEOMETRY ANALYSIS

MICROFICHE APPENDIX

A microfiche appendix containing 1 microfiche card with a total of 64 frames is attached hereto. The program listing set out in the microfiche contains materials that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates to automated language identification, and, more particularly, to automated language identification from images of printed documents. This invention was made with government support under Contract No. W-7405-ENG-36 awarded by the U.S. Department of Energy. The government has certain rights in the invention.

There is an increasing need for the automated retrieval of information from electronic documents. Of the vast quantity of electronic documents that constitute the world resource to be tapped by such tools, a significant number have been scanned directly from hard copy of textual information into electronic images. For example, in order to save space, many libraries are reducing the physical volume of their holdings by scanning paper copies of books and journals into electronic form. Although the main future use, within the library itself, of these scanned documents may by a person sitting at a display terminal and reading the documents, it is important to recognize that these images also represent an important data resource for applications of automated information retrieval technology. These images are not character-oriented data bases, which form the usual input to automated document information retrievals, but simply patterns of light and dark (i.e., images) stored in electronic format. As such, they present unique problems to be solved in automated information retrieval applications.

In an international environment, a crucial first step in this type of image processing is to apply pattern recognition techniques to identify, from the image alone, the language used to produce the original document. Once the language is known, the document can be routed to an appropriate human translator, or to a computer for further processing. Such further processing might include the application of conventional optical character recognition techniques (which require prior knowledge of the source alphabet) to extract the individual characters that make up the document.

One important problem in this area is the analysis of writing systems and the identification of a language from the writing system. But some writing systems employ connected alphabets, e.g., Hindi and Arabic. It would be desirable to perform writing analysis without separating a writing into individual characters or words.

Accordingly, it is an object of the present invention to perform an analysis of a document stored in an image format.

It is another object of the present invention to enable the analysis of connected writing systems.

Yet another object of the present invention is to obtain image features that enable a writing to be analyzed for the language comprising the writing.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method of this invention may comprise processes for identifying an unknown language used to create a document. A set of training documents is defined in a variety of known languages and formed from a variety of text styles. Black and white electronic pixel images are formed of text material forming the training documents and the document in the unknown language. A plurality of line strokes are defined from the black pixels and point features are extracted from the stroke segments that are effective to characterize each of the languages. Feature profiles are from from the extracted point features for the unknown language and for each of the known languages. A feature profile from the unknown language is compared with feature profiles from each of the known languages to identify one of the known languages that best represents the unknown language.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with the present invention, stroke-geometry analysis (SGA) provides for automated language identification from document images, including images scanned directly from hard copy. The SGA method works equally well with connected (or handwritten) writing systems and those based on separated characters and is tolerant of font variations and the common types of noise and distortion. The method is fast enough to be used in a number of real-time applications, such as automated document routing. As further described below, the process extracts features from an unknown writing and compares those features with features of known writing systems to obtain a high probability of identification.

Figure 1:
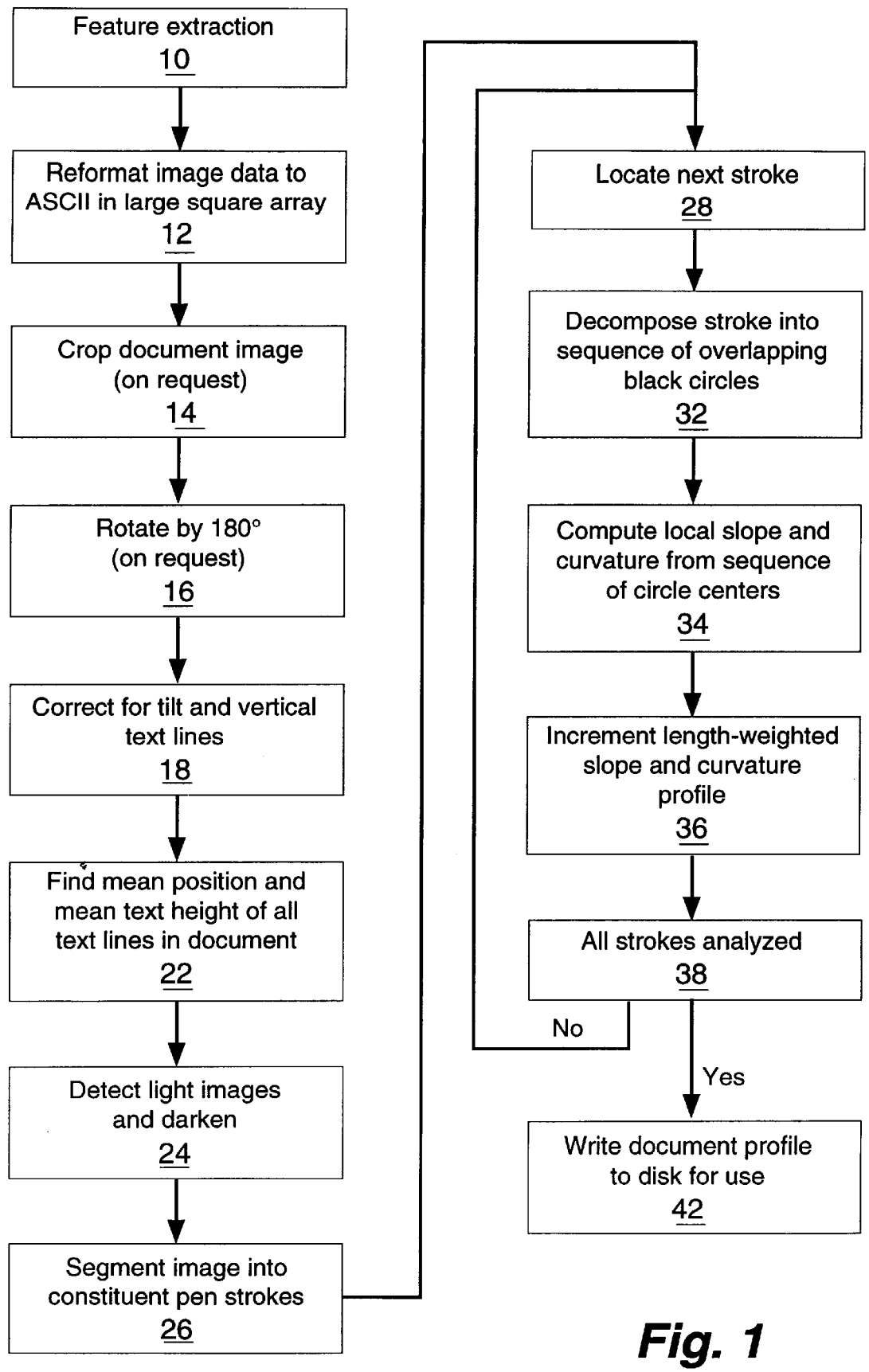
FIG. 1 is a flow chart of a process for constructing a file of features characteristic of known and unknown writing systems.
Figure 2:
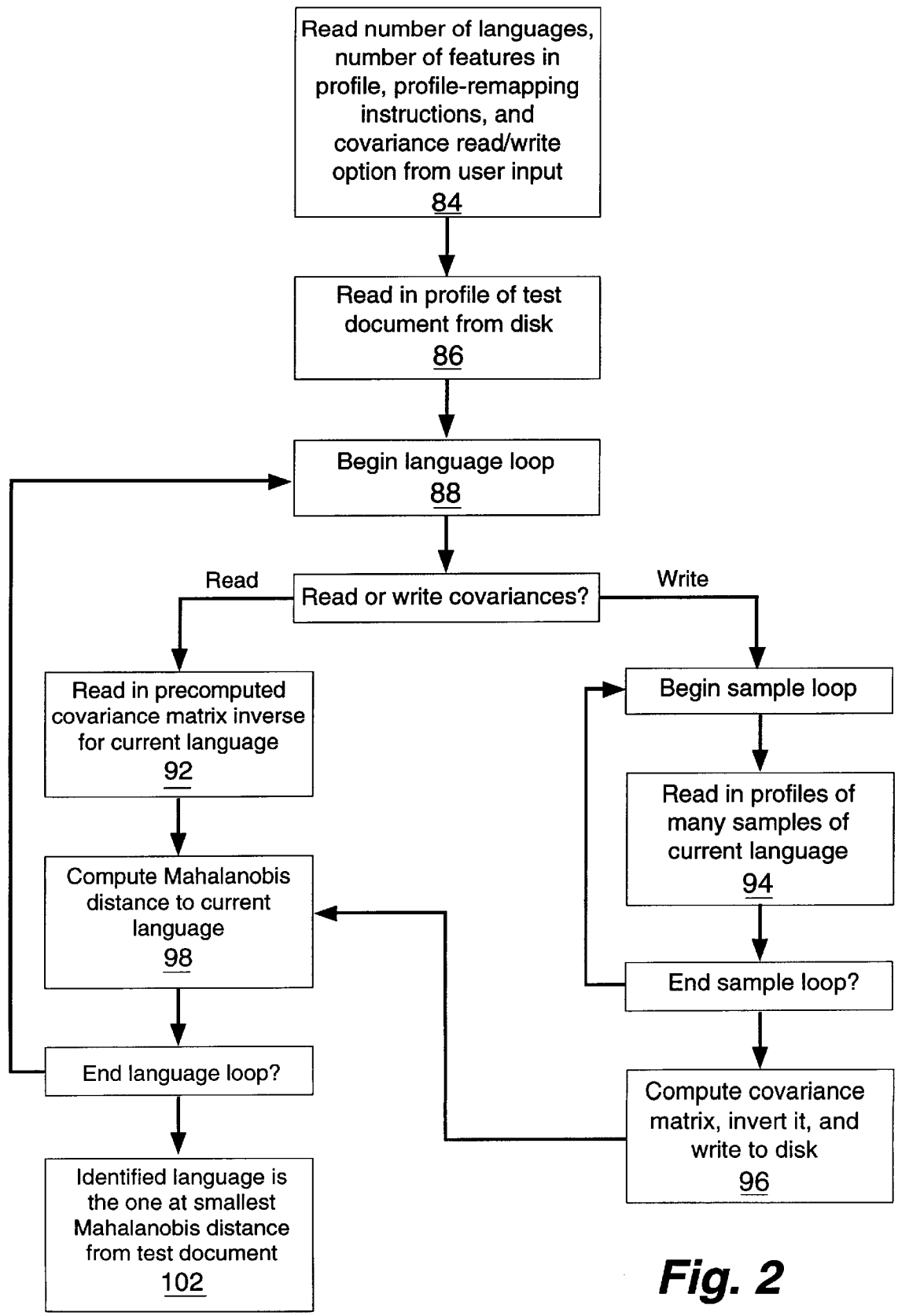
FIG. 2 is a flow chart of the process for writing system identification.

As shown in FIGS. 1 and 2, the method of the present invention first extracts from a document image the features that are most useful for language identification. A second process step then performs statistical and classification operations on the extracted features to determine the language used for the writing. In the start-up phase, images from a user-supplied training set are analyzed. The analysis routine locates 4-connected black regions in an image, segments the regions into constituent "pen strokes" and characterizes the geometric properties of the strokes in terms of length-weighted stroke orientation and curvature profiles at several different vertical positions within identified text lines. The classification routine then processes the resulting feature vectors to obtain the mean values and the covariance matrix of the features evaluated over the sample space spanned by a given language in the training set. The resulting covariance matrices are inverted and stored for later retrieval.

In a language identification phase, the features of an unknown test document are extracted using the same process as for the training documents. The classification routine then utilizes the precomputed covariance data, together with Bayes decision theory, to identify the language. During initial tests, the source languages of 11 test documents were identified with 100% accuracy. Each of the languages selected for the initial test (Amharic, Arabic, Chinese, Cyrillic, English, Greek, Hebrew, Hindi, Japanese, Korean, and Thai) was based on a different alphabet so that reliable classifications were obtained after analyzing only 6 lines of text. In a more challenging test, SGA successfully distinguished between documents written in the same alphabet and font, but in different languages (English and German).

To illustrate what is meant by the "general geometric properties" of a language, consider the qualitative differences between Latin lower-case characters a b c d e f g h i j k l m n o p q r s t u v w x y z and Greek lower-case characters

α β χ δ ε Φ γ η ι φ κ λ μ ν ο π θ ρ σ τ υ ω ψ ζ

Because of the close historical relationship of the Latin and Greek languages, the two alphabet sets have a number of similarities. For example, if one projects the total black-pixel density of a text line onto the vertical axis, the resulting one-dimensional profile is quite similar for the two languages. Fortunately, for purposes of the present invention, there are also significant differences, mainly having to do with the frequency of occurrence of different values of the slope and curvature of various segments of the "pen" strokes that make up the characters. Some important differences can be observed by simple visual inspection:
(a) Slope: In the Latin alphabet, there are few very strongly preferred stroke orientations (with examples provided by the letter "I" and the two strokes of the letter "v"), while Greek displays a broader continuum of stroke orientations.
(b) Curvature: The Latin alphabet has many occurrences of straight segments (zero curvature), segments with nearly constant curvature (such as the letter "o"), and V- and L-shaped "notches" (infinite curvature), while Greek displays a much broader range of stroke curvatures.

The present invention recognizes that a determination of the frequency of occurrence of various stroke-segment orientations and curvatures in a group of documents in image form provides discrimination between those images formed from different languages. It should be appreciated that the SGA process described herein can be applied equally well to separated-character and connected writing systems.

The shapes of individual characters do not, by themselves, fully determine the slope and curvature distributions of a given document, because these distributions also depend on the actual number of occurrences of each character in the document. For a large enough document, these document-summed distributions will approach asymptotic shapes that result from a convolution of the slope and curvature distributions for each individual character with the character-frequency distributions of the source language (the monographic distribution). Test results shown below demonstrate that it is possible to reliably identify the source alphabet of a test document containing only around 250 characters, which is much smaller than is needed to fully converge to a monographic distribution. This appears to indicate that the characters of a typical alphabet are geometrically more similar to each other, on the average, than they are to the characters of other alphabets. It is also possible, with a large enough test document and sufficient training data, to detect with this same method the more subtle geometric differences between documents written in the same alphabet and even the same typeface, but in different languages.

Referring now to FIG. 1, feature extraction process 10 begins by reformatting 12 image data into a data array that is suitable for feature extraction. "Image data" is the graphics data file produced by scanning a paper document. There are many suitable graphics data formats that are publicly available, e.g., TIFF-6.0, which was used for the exemplary results herein. Image data is first obtained in a monochrome raster format that is then converted to ASCII (e.g., PostScript, a trademark of Adobe Corporation) using publicly available software, e.g., tiff2ps. ASCII format images are then converted to a special-purpose sequential unformatted (binary) format using publicly available software, e.g., ps2bin. The output files produced by ps2bin contain the image in a format in which black pixels of the image are represented by the Fortran-77 character '*' and white pixels by the character ' '. Stroke geometry feature characterization begins with the reformatted image files.

The reformatted image files are first processed as shown in FIG. 1 to segment the image data into constituent pen strokes. The reformatted image files are read into virtual memory as a large square array, e.g., a 3400×3400 array of black ('*') and white (' ')characters. In a preferred embodiment for segmenting the image data, the data is first processed into a corrected data set. This pre-processing consists of:

A. Cropping 14 the image to disregard all pixels outside of a user-specified window in order to obtain an aligned data set and to eliminate non-linguistic symbols.
B. Inverting 16 the image, i.e., rotating the image by 180 degrees before further processing, if selected by the user.
C. Correcting 18 the image for tilt distortion and rotation. Some text material may not be "square" on the paper, i.e., the text may have a slope. In such distorted documents, a single row of the image matrix can have contributions from multiple text lines. It is necessary to detect and correct for such tilt before a reliable identification of text lines can be made.

Also, the processing routine includes a test for vertical orientation of the text lines(e.g., for application to Chinese and Japanese documents), a condition of "rotation distortion." When image data is first read from the storage disk, the document-integrated fraction of totally white "channels" as a function of "viewing angle" θ is computed for angles near 0° (the horizontal direction) and angles near 90° (the vertical direction). If the channel-viewing angle with the largest white-channel fraction is near 90°, the entire image is rotated clockwise by 90°. After rotation (if needed), tilt distortion is corrected by sliding data up or down within individual columns of the image matrix, so that the channel orientation with the largest white fraction is made exactly horizontal.

D. Line detection 22 is performed after corrections for tilt and rotation distortion have been applied. An algorithm detects lines from the occurrence of sudden, deep minima in the projection of black-pixel intensity onto the vertical axis. By the use of appropriate thresholds, line-detection logic tolerates large and sudden changes in pixel density without terminating the line. The projected pixel intensity is also used to compute the mean y-coordinate $y_m$ and standard deviation $\sigma$ for each located text line. The value of $\sigma$ is assumed to relate to the average "symbol size" for that text line and is used extensively for size normalization.

E. After line detection, light images (i.e., images that have a very low ratio of stroke width to text-line height) are detected 24 and are darkened to prevent premature termination of strokes that are being generated by the region-growing algorithm, discussed below. Whenever such a light image is detected, all white pixels that are 4-connected to a black region of the original image are set to a special "color" and are not treated as fitting errors when encountered by the region-growing algorithm, illustrated in FIG. 3, so that longer and smoother strokes are formed.

The term "fitting error" denotes the random occurrence of a few white pixels in the midst of a region of otherwise black pixels. Starting from a black "seed" pixel, the region-growing algorithm (see FIG. 3) attempts to find the largest totally-black circular region that can be grown around the "seed". In general, this growth process is halted when a white pixel is encountered. However, the present process makes some allowance for the possibility of noise, i.e., for fitting errors. Thus, a selected number of white pixels are permitted so that the growth of a region is not terminated until the occurrence of the selected number of noise-generated white pixels.

The term "four-connected" neighborhood means pixels that are interconnected with each other via edge connections. Consider the following 25 pixels (rectangular picture elements):

```
x x x x x
x x y x x
x y z y x
x x y x x
x x x x x
```

The pixels marked "y" are very close to pixel "z". In particular, they all share a rectangle-edge with "z". Pixels that share an edge with a particular pixel are said to be "4-connected" to that pixel. The pixels marked "x" are not 4-connected to "z", because they share at most a rectangle-corner with "z".

Figure 3:
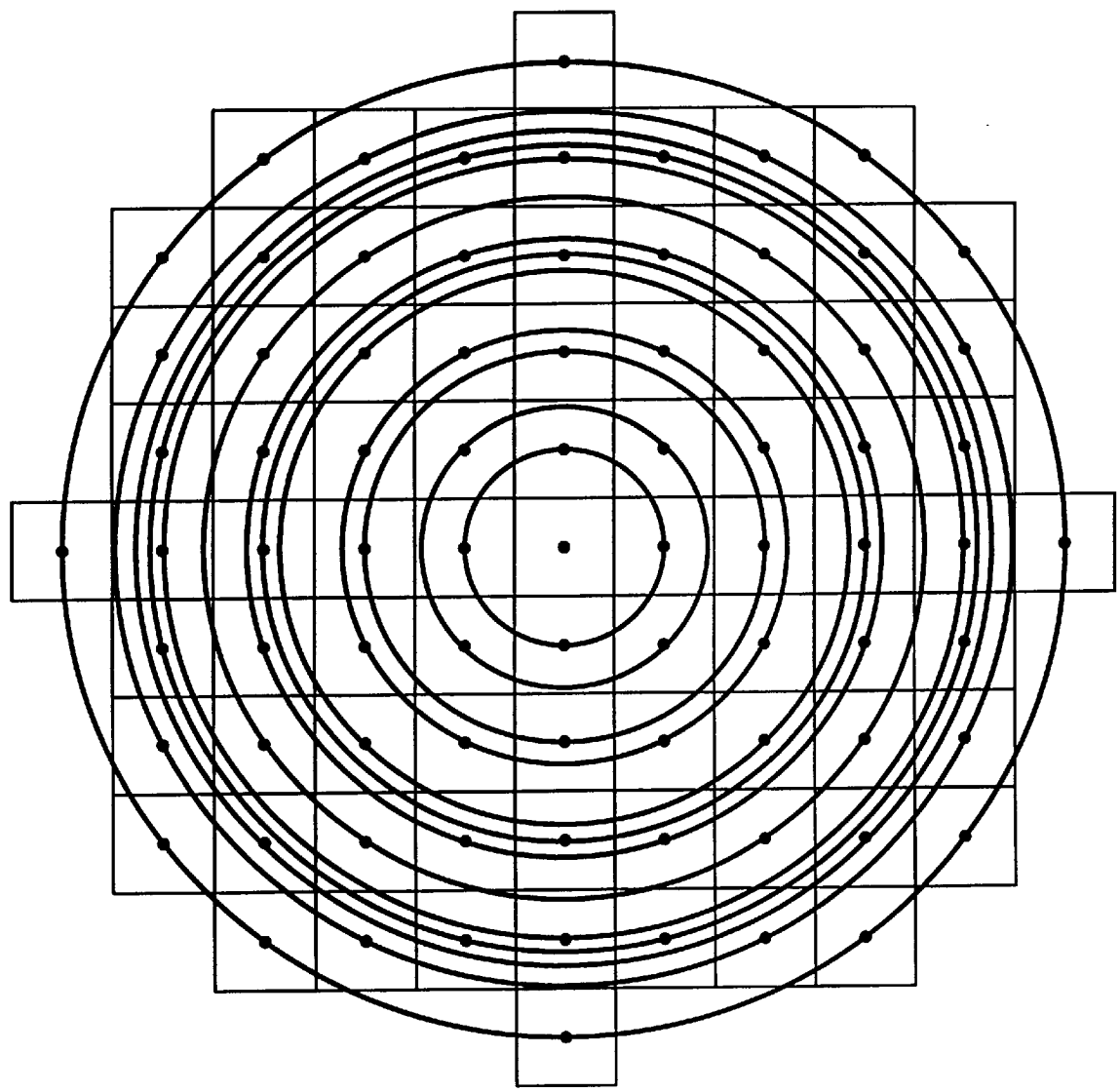
FIG. 3 graphically depicts the region growing algorithm used in the present invention.

After the preliminary processing, the image is segmented 26 into constituent "pen strokes" and, from the location and orientation of these strokes relative to the identified text lines, features are extracted that are useful for language identification. A feature of SGA is the algorithm used to "grow" quasi-circular regions around a central black, "seed" pixel. The operation of the region-growing process is generally illustrated in FIG. 3. Pixels centered on circles of gradually increasing radius are tested in clockwise order (right, bottom, left, top) until some limiting number of white pixels is encountered. This defines the largest, black, circular region that can be grown at that seed location.

Figure 4:
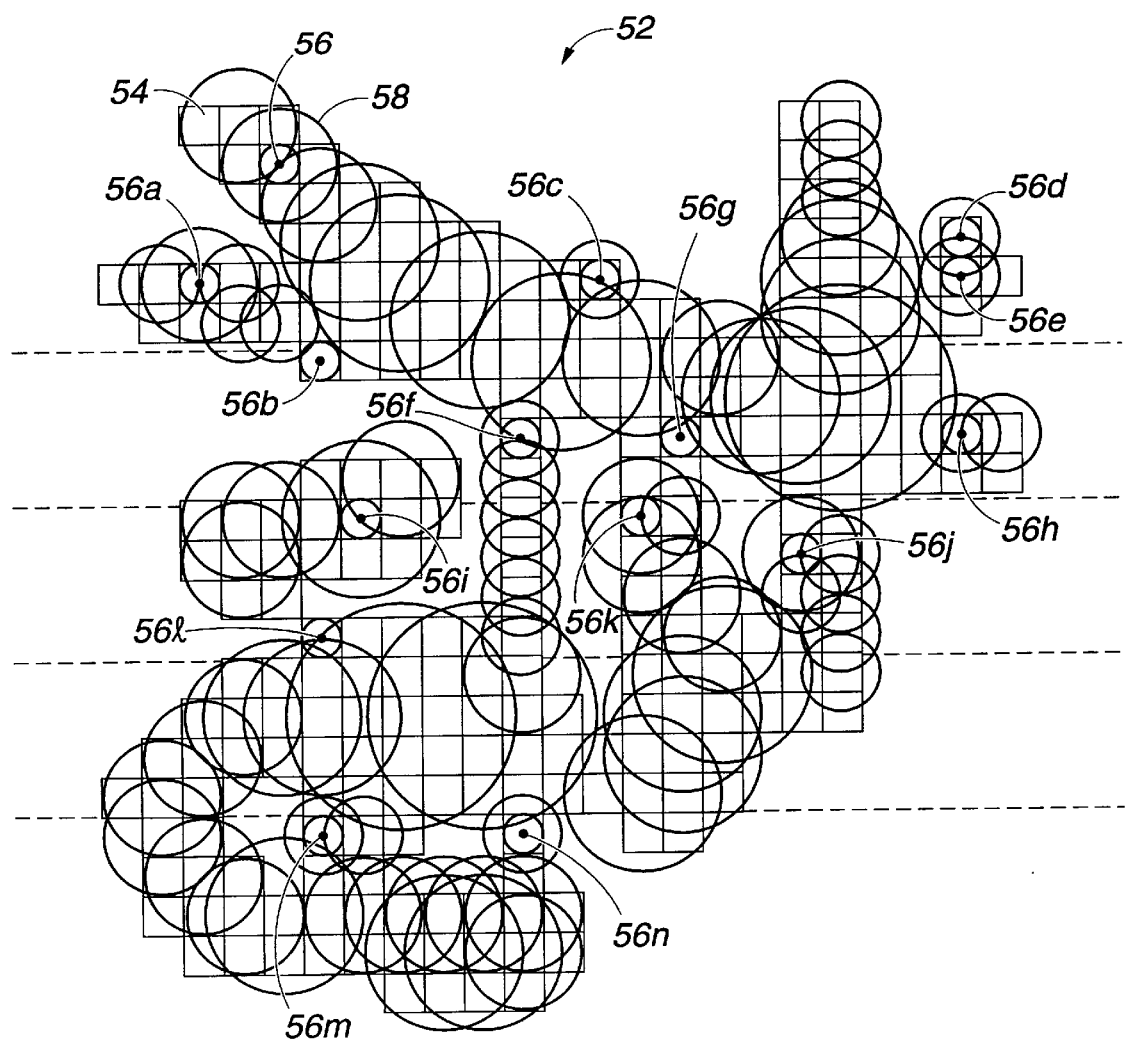
FIG. 4 illustrates an application of the algorithm shown in FIG. 3 to generating starting nodes for pen strokes.
Figure 5:
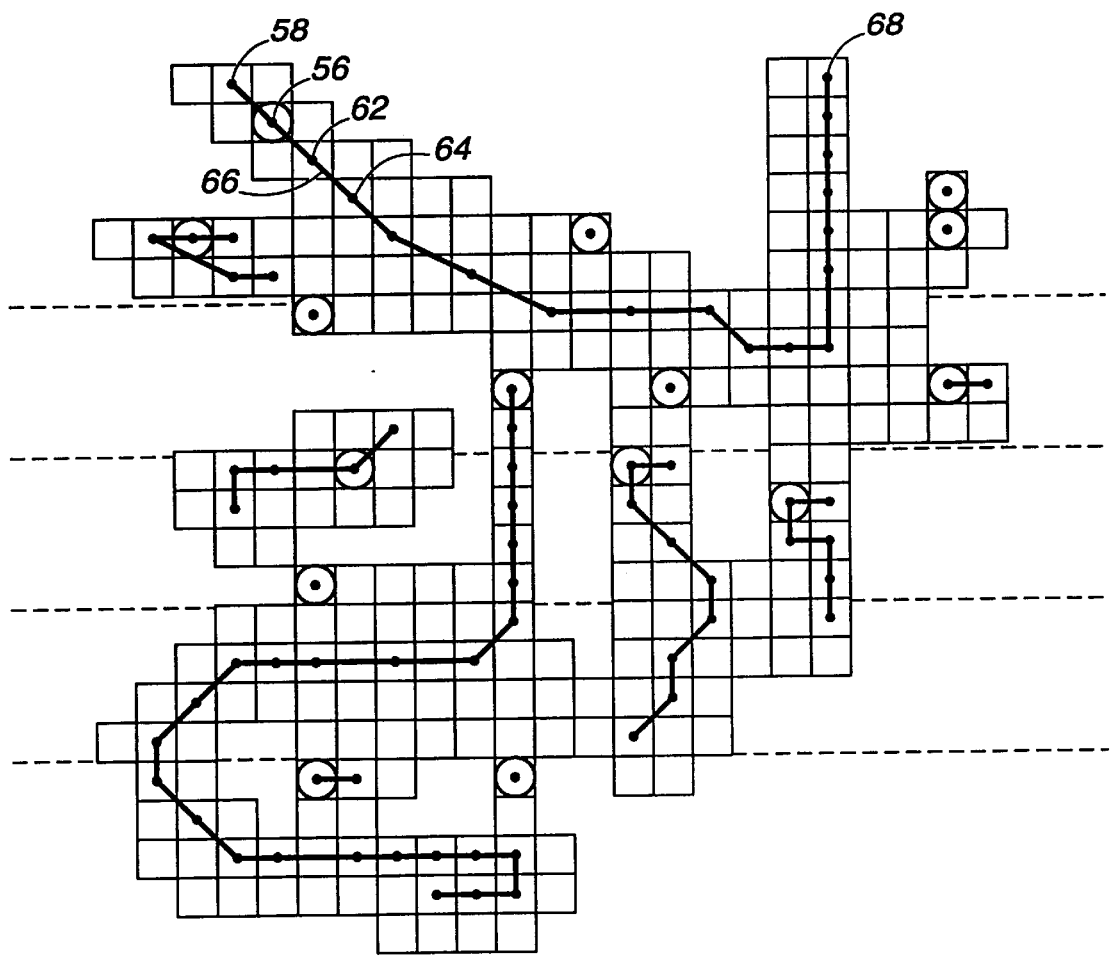
FIG. 5 illustrates the nodes and segments identified by the process shown in FIG. 4.

Pen stroke features are determined in the following steps with reference to FIGS. 4 and 5:

(a) Decompose 32 (FIG. 1) the image into a sequence of overlapping black circles. Starting at top left hand corner of image 52, locate 28 (FIG. 1) the first black pixel 54 not already attributed to a previous stroke. Search the 4-connected neighborhood of this starting pixel to locate the seed pixel 56 that generates the largest, circular, black region 58; the resulting seed pixel is the "starting node" of a new stroke, e.g., seed pixels 56a–56n.

(b) Examine potential seeds, e.g., seeds 62, 64 (both FIG. 5), in the perimeter region of previous circular regions. A set of weighted selection criteria, which enforce a "stroke-like" character, are applied to select one of these seeds as the next node in the stroke. For example, pixels 62, 64 permit stroke growth in the direction of new, large, black regions and are given preference. Pixels located in the "forward" direction (i.e., in the same direction as the previous stroke segment orientation) are also given preference. Sharp turns (e.g., bottom of the letter "v") are excluded unless further forward movement is not possible. The line, e.g., line 66, connecting two consecutively selected pixels is a stroke "segment."

(c) By these techniques, consecutive segments along the stroke are located until no new 4-connected black pixels can be found. This final seed pixel 68 becomes the "head" of the stroke. From the starting seed pixel 56 in step (a), check if the stroke can be extended in the reverse direction. If so, that extension is also followed to locate the "tail" 58 of the stroke.

Figure 6:
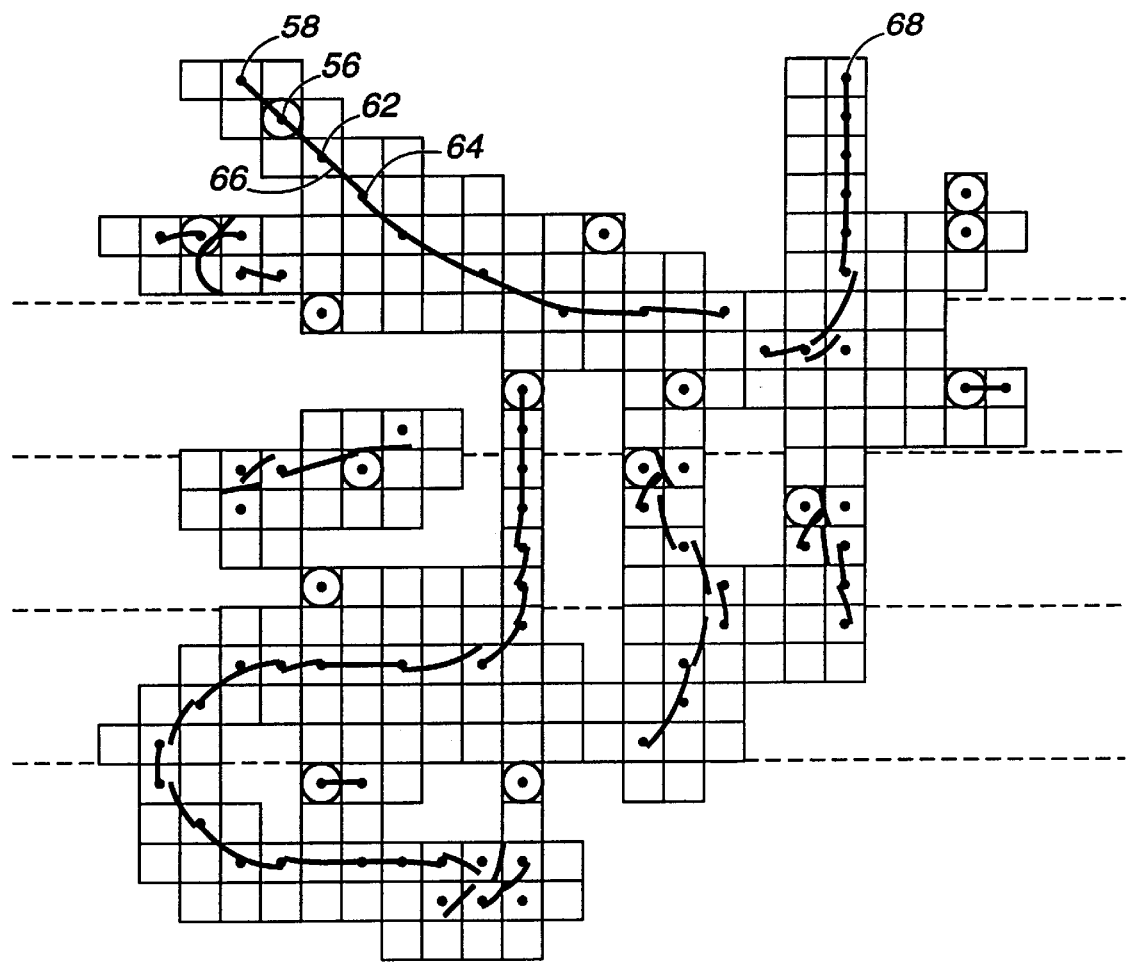
FIG. 6 illustrates the point features of stroke position, length, orientation and curvature of the stroke segments identified by the process shown in FIG. 5.

(d) The "point" features of each stroke segment are then extracted 34 (FIG. 1), as shown in FIG. 6, wherein the point feature has the same length as its associated stroke segment. The point features are the vertical position y of the mid-point of each individual stroke segment (the "target" segment), the local orientation angle ø, and the radius of curvature r, each weighted with the segment length. ø and r are determined by fitting a circular arc to the mid-point of the target segment and to the mid-points of 2 neighboring segments located at a distance along the stroke of approximately $\pm\sigma/2$ from the target. Slope and curvature are thus smoothed over a stroke-length interval of $\sigma$. ø and r are then the polar coordinates of the center of the fitting circle in a coordinate system centered on the mid-point of the target segment.

(e) A document feature profile is created 36 (FIG. 1) by binning point feature values, i.e., summing segment-length-weighted contributions into bins having defined value boundaries, e.g., 200 bins, based on segment vertical position (5 bins), smoothing-arc orientation angle (8 bins, e.g., each covering a 45° angle spread), and smoothing-arc radius of curvature (5 radius values). Binning the point feature values greatly reduces the number of computational steps and increases computational speed without significantly affecting the accuracy of the language identification.

In performing this integration, all segment lengths and curvature radii are expressed in "T-units" (1 T-unit=$\sigma/4$).

Steps (a) through (e) above are iterated 38 (FIG. 1) until all strokes in the document being examined have been found and processed. FIGS. 4–6 show the "largest black circles" (FIG. 4) and the resulting "nodes" (FIG. 5), with the line segments for extracting point features (FIG. 6) that result from the analysis of a single character from a language example, here a Chinese character. For this character, the originally vertical text lines have been rotated 90° into the standard, horizontal direction. The straight dashed lines indicate the location of the "vertical-position" bin boundaries, which, in this study, were placed at the location $(y_m-\sigma)$, $(y_m-\sigma/3)$, $(y_m+\sigma/3)$, and $(y_m+\sigma)$, where $y_m$ and $\sigma$ are computed from the pixel distribution of the current text line. The open circles in FIG. 5 identify the starting nodes of each stroke.

Figure 7:
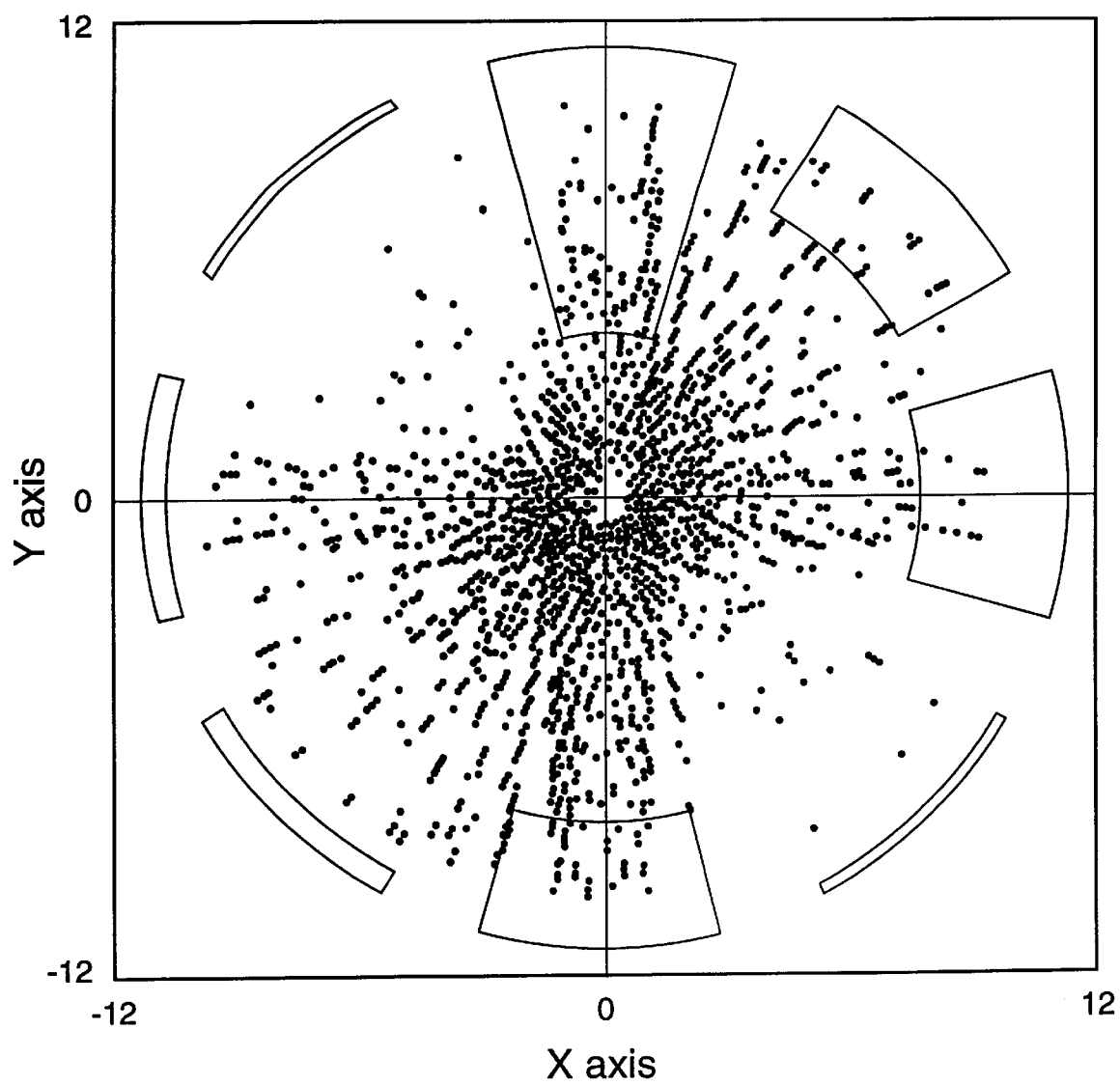
FIG. 7 graphically illustrates a two-dimensional distribution of centers of curvature for the example shown in FIGS. 4–6.

To provide guidance in the selection of specific bin boundaries in the definition of the slope and curvature features, the density function for the fitted local centers of curvature is displayed in two dimensions (length-weighted frequency vs. arc radius of curvature and arc orientation), relative to an origin placed at the center of the target segment. An example of such a display is shown in FIG. 7, which gives the center-of-curvature distribution, $P(r,\theta)$, extracted from a full (78,000 T-unit) document of the Chinese example language. A single plot symbol shows the center of curvature for one stroke segment. Note that the radial dependence of the center-of-curvature distribution is fairly smooth at all angles. The orientation distribution of "straight-line segments" [target segments for which the three points used in the circular fit of step (d) are collinear, which leads to an infinite radius of curvature] is indicated in FIG. 7 by the magnitudes of large symbols (with two straight lines and two curved sides) at the perimeter of the plot. For compatibility with the definition of the orientation angle ø of segments where the fitted local radius of curvature is large, but still finite, the "orientation angle" of such a straight-line segment is defined as 90° to the right of the direction of a vector drawn from the mid-point of the first of the three smoothing segments (nearer to the stroke head) to the mid-point of the third one (nearer to the stroke tail).

After analyzing a number of plots similar to FIG. 7 and performing some numerical tests, the following 5 radial features were selected as most informative:

(a) $<r^{-2}>$,
(b) $<r^{-1}>$,
(c) $1/<r^{+1}>$,
(d) $\int P(r,\o)dr$ from r=zero to 10 T-units (including notches), and
(e) $\int P(r,\o)dr$ from r =10 T-units to infinity (includes straight lines), where the averages $<r^{\pm r}>$ were performed over the range of radii from 1 to 10 T-units.

A feature file 42 (FIG. 1) is created to contain the feature profile (density, slope and curvature profiles) of a given text image. As shown in FIG. 2, the feature profile 42 (FIG. 1), which is created from known language samples, is processed 84 for use in the language identification process. A number of known, or previously characterized, languages that are available for purposes of identifying an unknown language are read and features from the language samples are extracted and profiled to create a mean feature profile for that language. The profile may be re-mapped to combine together previously extracted features to eliminate uninformative details to speed up the process. A covariance read/write option may be selected where the option is set to "read" in real-time identification operations and set to "write" during the training phase in which the covariance matrix is calculated from the details of the features of the training set.

In the training mode, the "test document" does not play an important role, although a sample document may be used. The purpose of the training calculations is to compute and store the covariances, which summarize the geometric properties of the languages that comprise the training set.

In the identification phase, the incoming "test" document is scanned and the feature profile is extracted 42 in the process shown in FIG. 1. Referring now to FIG. 2, the profile of the test document is then processed 84 and read 86 into the identification loop 88. The profiles for many samples of the training set are read 94 and a covariance matrix is computed 96. A Mahalanobis distance is calculated 98 between the profile of the unknown document and the mean profile of each known language, using the profile covariance matrix for each known language as an indication of profile variability within that language. The unknown sample is identified 102 as the known language having a minimum Mahalanobis distance from the unknown sample.

In a preferred embodiment of the present invention, features are extracted from an arbitrary document and the document is classified according to its source language using Bayes decision theory. Following the development of Bayes theory in Section 2.2 of R. O. Duda et al., "Pattern Classification and Scene Analysis," John Wiley and Sons, New York (1973), and Section 4 of P. H. Swain, "Pattern Recognition Techniques for Remote Sensing Applications," pp. 609–620, in P. R. Krishnaiah et al., "Handbook of Statistics, Vol. 2," North-Holland Publishing Co., (1982), both incorporated herein by reference, the d-component feature vector x extracted above from a document image is assumed to be a random variable, sampled from an underlying population that obeys a multivariate normal distribution. This normal distribution is assumed to be a fixed, intrinsic property of the source language. Let $p(x|\omega_j)$ be the conditional probability of "observing" the feature vector x when the source language is $\omega_j$. The training set is constructed from typical documents, e.g., documents with typical kinds of noise and distortion and with examples of major font variations. The sample mean $m_j$ and sample covariance matrix $C_j$ of the feature vectors, evaluated over all training documents written in language $\omega_j$, can be employed as reasonable estimates of the population mean and population covariance matrix of the underlying normal distribution:

$$p(x|\omega_j) \approx \frac{1}{(2\pi)^{d/2}\det(C_j)^{1/2}} \exp[-(x-m_j)^t C_j^{-1}(x-m_j)/2] \quad (1)$$

A suitable training set includes at least 10–20 examples of each of the languages expected to be encountered in a given application, including a representative range of styles (fonts, typefaces, etc.).

It should be noted that equation (1) assumes a normal (Gaussian) distribution. This assumption may not always be appropriate, for example, with a language $\omega_j$ that consists of two (or more) clearly distinct subclasses. For example, the Japanese language is usually printed in vertical-line format. However, when English terms are interspersed in a Japanese document, it is customary to switch to the English-like horizontal format. Rotation of "vertical Japanese" documents by 90°, as is performed in a normal process for feature extraction, results in a temporary document with horizontal text lines, but within these lines every individual Japanese character is rotated by 90°, relative to its orientation in "horizontal Japanese". Clearly these two subclasses will have quite different geometric characteristics, and this leads to probability distributions with two peaks for most features. A test document that is not very much like either subclass, but having a feature vector somewhat similar to the mean $m_j$ would then be mistaken for Japanese.

To the extent that it is practical, the best solution in such a case is to divide the original class ("Japanese") into two new classes ("vertical Japanese" and "horizontal Japanese")

and to create separate training sets for each subclass. The probability distributions for these new classes will no longer be bimodal. In addition, the covariance matrices describing the subclasses would have considerably smaller off-diagonal elements than the covariance matrix of the original class, and it is likely that sampling errors associated with the finite size of the training set would be reduced by the fact that fewer non-trivial matrix elements need to be estimated from the training data. For both of these reasons, classification reliability should be enhanced by such a separation.

Prior to observing x, the probability is $P(\omega_j)$ that the current test document actually is from language j. In the absence of other information, $P(\omega_j)$ can be estimated from historical data collected in the application of interest. The set of languages $\{\omega_1, \ldots, \omega_s\}$ is assumed complete, $$\sum_k P(\omega_k) = 1. \quad (2)$$

Bayes' theorem is now used to compute the posterior probability $P(\omega_j|x)$ that a document with the observed feature vector x was actually produced using writing system j, $$P(\omega_j | x) = p(x | \omega_j) P(\omega_j) / \sum_k p(x | \omega_k) P(\omega_k) \quad (3)$$

Equation (3) is the key step in using Bayes decision theory to classify a given test document into language i.

If it is concluded that the writing system is of type i when the true language is actually j, a "loss" or penalty $\lambda_{ij}$ will be incurred. To calculate the expected loss associated with classification decision i, simply average $\lambda_{ij}$ over all possible source languages, $$R(\omega_i | x) = \sum_j \lambda_{ij} P(\omega_j | x). \quad (4)$$

If it is possible to make the approximation that all incorrect classifications are equally costly and a correct classification produces zero loss, then considerable simplification results. In this case, the loss function becomes $$\lambda_{ij} = 1 - \delta_{ij}, \quad (5)$$

where $\delta_{ij}$ is the Kronecker delta. In this case, combining Equations (2), (4), and (5), the expected loss becomes:

$$R(\omega_i|x) = 1 - P(\omega_i|x). \quad (6)$$

The Bayes decision rule is then the following: After observing x, first compute from Equation (4) [or the alternate form in Equation (6), if applicable] the expected loss incurred by classifying the current document into each of the writing systems i, and then choose the system that minimizes this loss. In the uniform-loss case, Equations (5) and (6), this is the same as choosing the language with the maximum posterior probability $P(\omega_i|x)$. In accordance with a preferred embodiment of the present invention, the maximization of $P(\omega_i|x)$ is adopted for the basis of the language classification strategy. The maximum of $P(\omega_i|x)$ will be reached for the same language that maximizes the logarithm of $P(\omega_i|x)$. Taking the natural logarithm of both sides of Equation (3), doubling the result, and discarding terms that are the same for all candidate languages, the following expression is obtained for the "discriminant function", $$g_i = 2 * ln[P(\omega_j)] - (x - m_j)^t C_j^{-1} (x - m_j) - ln[det(C_j)] \quad (7)$$

The quadratic form $(x - m_j)^t C_j^{-1} (x - m_j)$ is the generalized distance from the text document with feature vector x to the language $\omega_j$, expressed in covariance units, and is commonly called the squared "Mahalanobis distance", $D^2$. Because of the logarithms involved in the other terms, $D^2$ is normally the dominant contributor to the discriminant function.

In summary, the expected loss is minimized by choosing the language with the maximum posterior probability, which is the one (except for logarithmic terms) with the minimum Mahalanobis distance from the observed feature vector x.

For small documents (say, less than 20 lines) a significant source of document-to-document feature variability is statistical fluctuation in the number of occurrences N of a given linguistic symbol. The magnitude of this variability var(N)= N, is clearly a strong function of document size, so it is necessary to estimate the covariance matrix $C_j$ that appears in the above expressions as a function of document size. By "size" is meant the accumulated stroke length, expressed in "T-units", as defined above. In the present process, the accumulated integrals over stroke length that form the basis of the extracted features are written to the feature file every 1000 T-units, which is about the total stroke length contained in a typical line of text. With the availability of these feature integrals as a function of document size, the process is able to perform all of its classification operations, also as a function of document size.

Verification tests of the SGA methodology were done using 11 different languages in order to check out the overall integrity of the computer programs that carry out the process shown in FIGS. 1 and 2 and to determine the computer time required to perform the process. The following document images were used in the test:

| Amharic1 | Aragbic11 | Chinese1 | Cyrillic1 | English1 | Greek1 |
| Amharic2 | Arabic14 | Chinese2 | Cyrillic2 | English2 | Greek2 |
| Amharic3 | Arabic4 | Chinese2t | Cyrillic2t | English2t | Greek3 |
| Amharic4 | Arabic5 | Chinese3 | Cyrillic3 | English3 | Greek4 |
| Amharic4t | Arabic5t | Chinese4 | Cyrillic4 | English4 | Greek4t |
| Amharic5 | Arabic6 | Chinese8 | | English5 | Greek5 |
| Hebrew1 | Hindi1 | Japanese14 | Korean1 | Thai1 | |
| Hebrew2 | Hindi2 | Japanese15 | Korean2 | Thai2 | |
| Hebrew3 | Nindi3 | Japanese15t | Korean20 | Thai3 | |
| Hebrew4 | Hindi4 | Japanese16 | Korean3 | Thai3t | |
| Hebrew6 | Hindi5 | Japanese17 | Korean3t | Thai4 | |
| Hebrew7 | Hindi5t | Japanese18 | Korean30 | Thai5 | |

The writing systems were selected to include two connected writing systems (Arabic and Hindi) and nine other writing systems with a wide variation in general visual appearance. For each of the listed images, except for those with names ending in the letter "t", a "large training document" was constructed by taking the first 10,000 T-units (approximately 10 lines) of text of a language example. Documents with a name ending in "t" denote a "large test document". Large test documents contain, in each case, the text lines corresponding to the final 10,000 T-units of the largest example of a given language. In no case was there any actual text overlap between the "large-test" and the "large-training" documents. Thus, at least one document in the training set has the same writing style as the test document.

The value of the Bayes discriminant function computed from Equation (7) was computed for each test document for different document sizes. Test document sizes of 1,000 to 10,000 T-units were formed and values of $D^2$ were computed over the range of document sizes. Application of the Bayes decision rule (choosing the language that minimizes $D^2$) provided 100% accuracy in language identification with test document sizes greater than about 6,000 T-units (about 6 lines of text).

In applying Equation (7) for this test, it was assumed that all a priori probabilities of $P(\omega_j)$ are equal, and were therefore neglected in computing the discriminant. It was also found necessary in computing the discriminant function to augment the diagonal elements of all covariance matrices $C_j$, both in order to avoid singularities due to the complete absence of certain features for certain language classes and to remove rank deficiency that is inherent in the sampling process. In particular, each variance $[C_j]_{kk}$, as determined initially from the sample covariance matrix of the training set, was replaced with the slightly higher value of $\{0.001+[C_j]_{kk}*1.01\}$. The addition of the small absolute component does not compromise the training data because the selected features, and their standard deviations, are normalized to have magnitudes in the neighborhood of unity.

For timing estimates, it was assumed that all training documents were 10,000 T-units in length. It required about 30 seconds of SPARCstation-10 CPU time to extract the features of one document of this size. For each distinct language-size combination, it is necessary to invert a 200× 200 covariance matrix, and each matrix inversion currently takes about 10 second of CPU time. Thus, a library constructed from 5 size-samples each of 20 language-samples of each of 25 languages would require about 4.5 hours of CPU time for training. After receiving a test document, it takes about 30 seconds to extract the features and around 1 second of CPU time to compute the discriminant function for each candidate language. Thus, the language identification of a test document should be complete in about 55 seconds. These times are based on unoptimized programs that carried out the functions of FIGS. 1 and 2.

In a second test, training was done with 12 English-language documents and 12 German-language documents, where the training inputs were all printed in an identical font and scanned using the same scanner. The test sets then consisted of 4 English-language documents and 4 German-language documents. While English and German have a close linguistic relationship, clear separation of the $D^2$ values were obtained after 30,000 T-units (about 30 lines of normal text). There are sufficient differences between the monographic distributions in the two languages (e.g., the character "Z" is more common in German than in English; "C" is more common in English than in German) to provide a clear impact on the slope and curvature profiles for the two languages with the resulting separation in $D^2$ values.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer automated method for identifying an unknown language used to create a document, including the steps of:

defining a set of training documents in a variety of known languages and formed from a variety of text styles;

forming black and white pixel images of text material defining said training documents and said document in said unknown language;

locating a plurality of seed black pixels from a region growing algorithm;

progressively locating black pixels having a selected relationship with said seed pixels to define a plurality of line stroke segments that connect to form a line stroke;

identifying black pixels to define a head and a tail black pixel for each said line stroke;

extracting point features from said line stroke segments, where the point features include a vertical position and slope of individual line stroke segments, and locally-averaged radius of curvature that are effective to characterize each of said languages;

forming feature profiles from said point features for an unknown language and each of said known languages; and comparing said feature profile from said unknown language with each of said feature profiles from said known languages to identify one of said known languages that best represents said unknown language.

2. A method according to claim 1, wherein said step of comparing said feature profile from said unknown language with said feature profiles from said known language further includes the steps of:

generating from said feature profiles of a number of samples of each said known language a mean profile and a covariance matrix as a measure of profile variability for that language;

determining a Mahalanobis distance between said profile for a document in said unknown language and said mean profile for each said known language; and selecting said known language having a minimum said Mahalanobis distance to best represent said unknown language.

* * * * *